(No Model.)
A. M. CARD.
NUT LOCK.
No. 325,589. Patented Sept. 1, 1885.
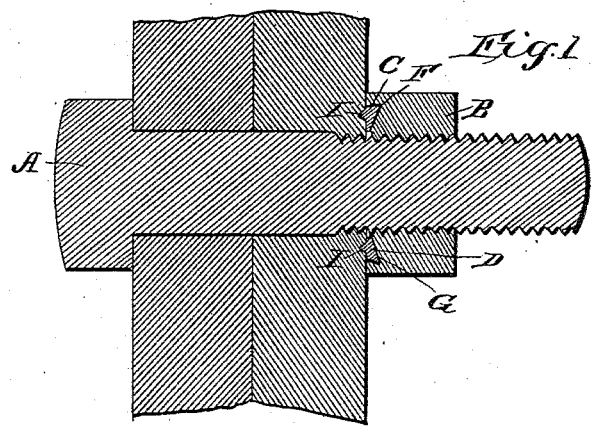
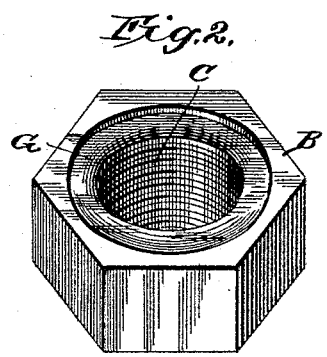
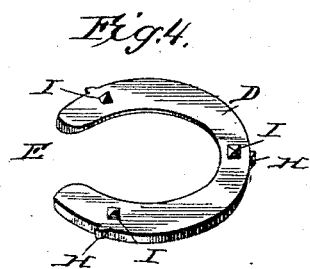 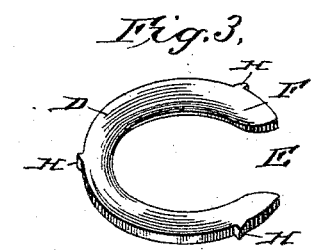
WITNESSES:
Augustus M. Card
INVENTOR.
By Louis Bagger & Co.
ATTORNEYS.

UNITED STATES PATENT OFFICE.

AUGUSTUS M. CARD, OF BUFFALO, NEW YORK, ASSIGNOR OF ONE-HALF TO JAMES A. SKELTON, OF SAME PLACE.

NUT-LOCK.

SPECIFICATION forming part of Letters Patent No. 325,589, dated September 1, 1885.

Application filed March 23, 1885. (No model.)

*To all whom it may concern:*

Be it known that I, AUGUSTUS M. CARD, a citizen of the United States, and a resident of Buffalo, in the county of Erie and State of New York, have invented certain new and useful Improvements in Nut-Locks; and I do hereby declare that the following is a full, clear, and exact description of the invention, which will enable others skilled in the art to which it appertains to make and use the same, reference being had to the accompanying drawings, which form a part of this specification, and in which—

Figure 1 is a longitudinal sectional view of a bolt provided with my improved nut-lock, showing the bolt and nut applied to two parts of material, the said material appearing in cross-section. Fig. 2 is a perspective view of the under side of the nut. Fig. 3 is a similar view of the washer, seen from its upper side, and Fig. 4 is a perspective view of the under side of the washer.

Similar letters of reference indicate corresponding parts in all the figures.

My invention has relation to nut-locks having a washer provided with projections adapted to enter the nut and the material to which the bolt is applied, and thus retain them in their adjusted position; and it consists in the improved construction and combination of parts of the same, as hereinafter more fully described and claimed.

In the accompanying drawings, the letter A indicates the bolt, which is of the usual construction, and B is the nut, which is formed with an annular recess, C, in its under side around the threaded perforation. The bottom of this recess is inclined from the middle toward the outside, and the washer D, which is of spring metal, and which is annular and open at one side, as shown at E, has one side, F, inclined or beveled inward to fit upon the said bottom G.

The edge of the washer is provided with a number of ratchet-teeth, H, facing with their oblique sides against the direction in which the nut is turned to be turned home, so that they will allow the nut to slip over them when it is screwed home, while they will bite with their points into the sides of the recess when the nut should be turned so as to be unscrewed.

The under side of the washer is provided with a number of pointed teeth, I, which may enter the material in which the bolt is used when the nut is screwed hard against it.

It will be seen that the inclined bottom of the recess bearing against the inclined upper side of the washer will force the washer open, and force the ratchet-teeth into the sides of the recess, causing them to bite into them, and in this manner it will be impossible for the nut to work itself off from the bolt, and it will be very difficult to unscrew the nut, it being necessary to overcome the resistance of the ratchet-teeth cutting into the sides of the recess.

Having thus described my invention, I claim and desire to secure by Letters Patent of the United States—

1. In a nut-lock, the combination of a nut having an annular recess around its threaded bore, with a spring-washer open at one side, having teeth upon its under side, and having ratchet-teeth upon its outer edge facing with their oblique sides against the direction of revolution of the nut when it is screwed home, as and for the purpose shown and set forth.

2. In a nut-lock, the combination of a nut having an annular recess around its threaded bore provided with an outwardly-inclined bottom, with a spring-washer open at one side, having its upper side inclined inward, provided with ratchet-teeth in its edge facing with their inclined sides against the direction in which the nut is screwed home, and provided with teeth upon its under side, as and for the purpose shown and set forth.

In testimony that I claim the foregoing as my own I have hereunto affixed my signature in presence of two witnesses.

AUGUSTUS M. CARD.

Witnesses:
J. A. SKELTON,
G. M. KYLE.